(12) United States Patent
Caronni (10) Patent No.: US 7,328,343 B2
(45) Date of Patent: Feb. 5, 2008

(54) METHOD AND APPARATUS FOR HYBRID GROUP KEY MANAGEMENT

(75) Inventor: Germano Caronni, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 729 days.

(21) Appl. No.: 10/797,148

(22) Filed: Mar. 10, 2004

(65) Prior Publication Data

US 2005/0204161 A1    Sep. 15, 2005

(51) Int. Cl.
*G06F 9/00* (2006.01)
(52) U.S. Cl. ............... 713/171; 713/161; 713/164; 713/168; 713/187; 713/193
(58) Field of Classification Search ............... 713/171, 713/161, 164, 168, 182, 193
See application file for complete search history.

(56) References Cited

U.S. PATENT DOCUMENTS 6,049,878 A    4/2000    Caronni et al.

FOREIGN PATENT DOCUMENTS

WO    WO 01/03365 A1    1/2001

OTHER PUBLICATIONS

G. Caronni et al.; "Efficient Security for Large and Dynamic Multicast Groups"; Proceedings of the Seventh Workshop on Enabling Technologies; WET ICE '98; IEEE Computer Society Press; 1998 (8 pages).
M. Waldvogel et al.; "The VersaKey Framework: Versatile Group Key Management"; IEEE Journal on Selected Areas in Communications, vol. 17, No. 8; Aug. 1999 (15 pages).
European Search Report dated Jun. 17, 2005 (3 pages).
Wong; "Secure Group Communications Using Key Graphs"; IEEE/ACM Transactions on Networking, vol. 8, No. 1, Feb. 2000, pp. 16-30 (15 pages).

*Primary Examiner*—Thomas R. Peeso
(74) *Attorney, Agent, or Firm*—Osha Liang LLP (57) ABSTRACT

A system for group key management including a keying material infrastructure including a root portion configured to store a root public key, a key encryption key portion operatively connected to the root portion configured to store a traffic encryption key encrypted using a symmetric key encryption key, and a public key encryption key, and a first client operatively connected the key encryption key portion configured to store the symmetric key encryption key encrypted using a first client symmetric key, and a first group member configured to access the traffic encryption key using the first client symmetric key.

18 Claims, 6 Drawing Sheets

METHOD AND APPARATUS FOR HYBRID GROUP KEY MANAGEMENT

BACKGROUND

Distributed applications such as multimedia conferencing, computer-supported collaborative work, distributed computing, and remote consultation and diagnosis systems for medical applications depend on efficient information exchange among multiple participants. Multi-destination communication and data exchange over a public network is essential for such applications. Some applications, generally including a small number of sending parties and a large, dynamically changing group, of receiving parties are typically referred to as "broadcasting applications." Other applications generally referred to as "conferencing applications," involve a large number of sending and receiving participants. When a group of people seeks to communicate in a conference over a public network (such as the Internet), every message sent out by one of the participants is received by all other participants. The mechanism used to perform this type of communication is referred to as "multicast." Any Internet subscriber or user with access to a public network may subscribe to a multicast group and subsequently receive all messages sent by users of this group. Additionally, any multicast recipient may be able to send messages to the whole group.

Multicast is rapidly becoming an important mode of communication as well as an effective platform for building group-oriented communication services. However, when used for secure or trusted communication, existing multicast techniques should be supplemented by tools for protecting (i.e., encrypting and authenticating) traffic, controlling participation, and restricting access from unauthorized users.

A need for secure electronic information exchange over insecure public networks is increasingly apparent. As compared to conventional unicast, (i.e., point-to-point communication), multicast is more susceptible to attack. Typically, multicast transmissions present substantially more opportunities for interception of the traffic because multiple senders and receivers exist, increasing the possibility of at least one of the messages communicated across the network may be intercepted. Thus, when an attack occurs, a large number of multicast participants are affected. Further, because multicast addresses are often well known, finding targets is easier for attackers. Moreover, multicast typically involves a large number of authorized users, allowing attackers to easily pose as a legitimate user and attempt attacks in parallel.

To help achieve secure electronic information exchange, a network security protocol should allow authorized participants to communicate securely over an insecure network under conditions where an attacker is assumed to be able to read, insert, modify, and delete raw communications. Typically, this protocol is achieved by creating a security association between the authorized participants through authentication and key exchange. The security association defines a set of keying material shared only by the authorized participants. The set of keying material may be used for a variety of security objectives, such as authentication, confidentiality, and integrity verification.

In a multicast scenario, the security association between participants is dynamic to support membership changes. Further, a secure multicast ensures that participants are only allowed to participate during authorized periods. A participant may be authorized to participate in the secure multicast during some periods of time and not authorized to participate during other periods. For example, with pay-per-view program access privileges, a receiver is only authorized for the time period for which he/she has paid. The security association and group keying material defined for each of the participants in a multicast scenario is changed each time a participant joins or leaves the multicast group. This change is required to ensure that a joining participant is not able to access previously multicast data and the leaving participant is unable to continue to accessing data multicast after authorization expires. The management and distribution of dynamic security association and keying material is a fundamental challenge in a secure multicast protocol.

Conventional methods for managing group members for secure group-wise communication have relied upon a central group manager, which maintains all the keys. Further, the central group manager may use the knowledge of all the keys within the group to perform a key change. In addition, conventional methods typically require that all members are present when the key change is performed (see, e.g., U.S. Pat. No. 6,049,878).

SUMMARY

In general, in one aspect, the invention relates to a system for group key management comprising a keying material infrastructure comprising a root portion configured to store a root public key, a key encryption key portion operatively connected to the root portion configured to store a traffic encryption key encrypted using a symmetric key encryption key, and a public key encryption key, and a first client operatively connected the key encryption key portion configured to store the symmetric key encryption key encrypted using a first client symmetric key, and a first group member configured to access the traffic encryption key using the first client symmetric key.

In general, in one aspect, the invention relates to a method for group key management for a plurality of group members, comprising generating a request to perform at least one operation selected from the group consisting of a traffic encryption key change, a join operation, and a leave operation, determining whether the one of the plurality of group members initiating the request is a group owner, determining the one of the plurality of group members upon which the operation is being performed, rekeying a traffic encryption key and at least one client symmetric key, wherein the at least one client symmetric key is in a path from a client portion of a keying material infrastructure to a root portion of the keying material infrastructure, generating a root private key and an at least one client private key if the at least one operation is the leave operation, forwarding the traffic encryption key and the at least one client symmetric key to the plurality of group members using symmetric cryptography if the at least one operation is the join operation and the one of the plurality of group members initiating the request is the group owner, forwarding the traffic encryption key, the at least one client symmetric key, the root private key, and the at least one client private key to all of the remaining plurality of group members using symmetric cryptography, if the at least one operation is the leave operation and the one of the plurality of group members initiating the request is the group owner, forwarding the traffic encryption key and the at least one client symmetric key to the plurality of group members using symmetric cryptography and asymmetric cryptography if the at least one operation is the join operation and the one of the plurality of group members initiating the request is not the group owner, and forwarding the traffic encryption key, the at least one client symmetric key, the root private key and the at least one client private key to all of the remaining plurality of group members using at least one selected from group consisting of symmetric cryptography and asymmetric cryptography if the operation is the leave operation and the one of the plurality of group members initiating the request is not the group owner.

In general, in one aspect, the invention relates to a system comprising a plurality of nodes comprising a keying material infrastructure comprising a root portion configured to store a root public key, a key encryption key portion operatively connected to the root portion configured to store a traffic encryption key encrypted using a symmetric key encryption key, and a public key encryption key, and a first client operatively connected the key encryption key portion configured to store the symmetric key encryption key encrypted using a first client symmetric key, and a first group member configured to access the traffic encryption key using the first client symmetric key, wherein root portion is stored on one of the plurality of nodes, wherein key encryption key portion is stored on one of the plurality of nodes, wherein the first client is stored on one of the plurality of nodes, and wherein the first group member is stored on one of the plurality of nodes.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
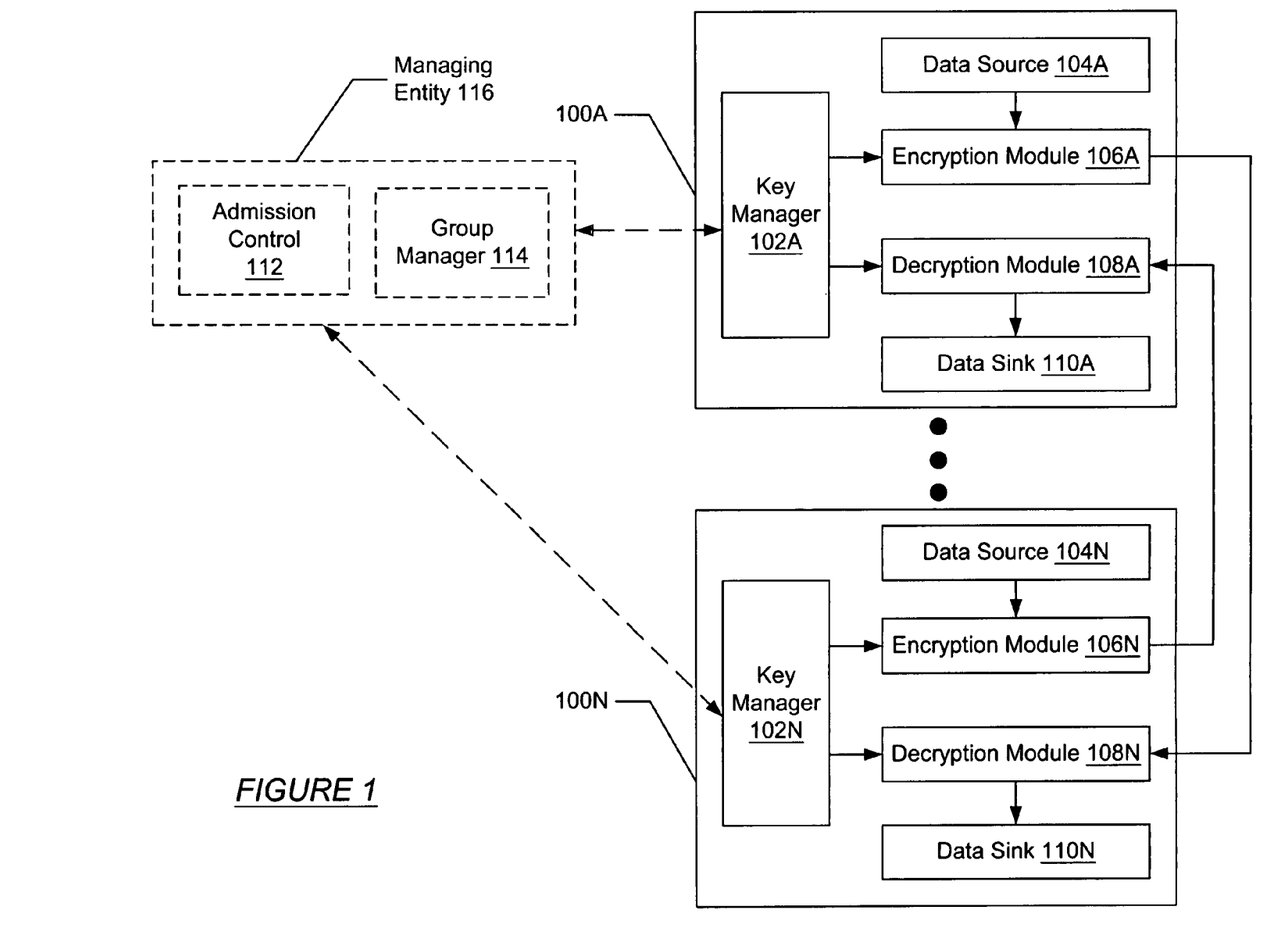
FIG. 1 shows a system architecture in accordance with one embodiment of the invention.

FIG. 1 shows a system architecture in accordance with one embodiment of the invention. Specifically, one or more embodiments of the invention may be implemented using the architecture shown in FIG. 1. Specifically, each group member (100A, 100N) includes a key manager (102A, 102N), a data source (104A, 104N), an encryption module (106A, 106N), a decryption module (108A, 108N), and a data sink (110A, 110N). The group member (100A, 100N) corresponds to an entity (e.g., a process) that has access to the group of connected entities, such as a multicast group, a broadcast group, etc. The group member (100A, 100N) typically uses the keying material infrastructure (described below) to communicate without group members.

The key manager (102A, 102N) typically includes the key(s) necessary to encrypt communication between various group members. In addition, the key manager (102A, 102N) includes functionality to communicate key change updates to other group members. In one embodiment of the invention, the data source (104A, 104N) contains data that the given group member (100A, 100N) desires to communicate with other group members (100A, 100N). Prior to communicating this data, the encryption module (106A, 106N) obtains the necessary keys from the key manager (102A, 102N) and encrypts the data. The encrypted data is subsequently communicated to the other members in the group (100A, 100N). Upon receiving the encrypted data, the decryption module (108A, 108N) obtains the necessary keys from the key manger (102A, 102N) and decrypts the encrypted data. The decrypted data is subsequently forwarded to the data sink (110A, 110B). The data stored in the data sink (110A, 110B) may be subsequently accessed by applications associated with the group member (100A, 110N) and displayed, for example, to the user who has access to the particular group member (100A, 100N).

In one embodiment of the invention, access to a given group is controlled by an admission control (112). The admission control (112) may include functionality to allow a given entity to become a group member (100A, 110N). A group manager (114) initially provides new keying material to an entity that is allowed to join the group (i.e., after the authentication control (112) has verified that the entity is allowed to join the group). In addition, the group manager (114) may hold a majority of a keying material infrastructure (described below in FIG. 2). The authentication control (112) and the group manager (114) may be collectively referred to as a managing entity (116).

In one embodiment of the invention, the functionality of the authentication control (112) and the group manager (114) may be distributed among the key mangers (102A, 102N) present in the group members (100A, 100N). Those skilled in the art will appreciate that the aforementioned architecture is only meant to illustrate one possible architecture upon which the invention may be used, and is not intended to limit the architectures upon which the invention may be deployed.

Figure 2:
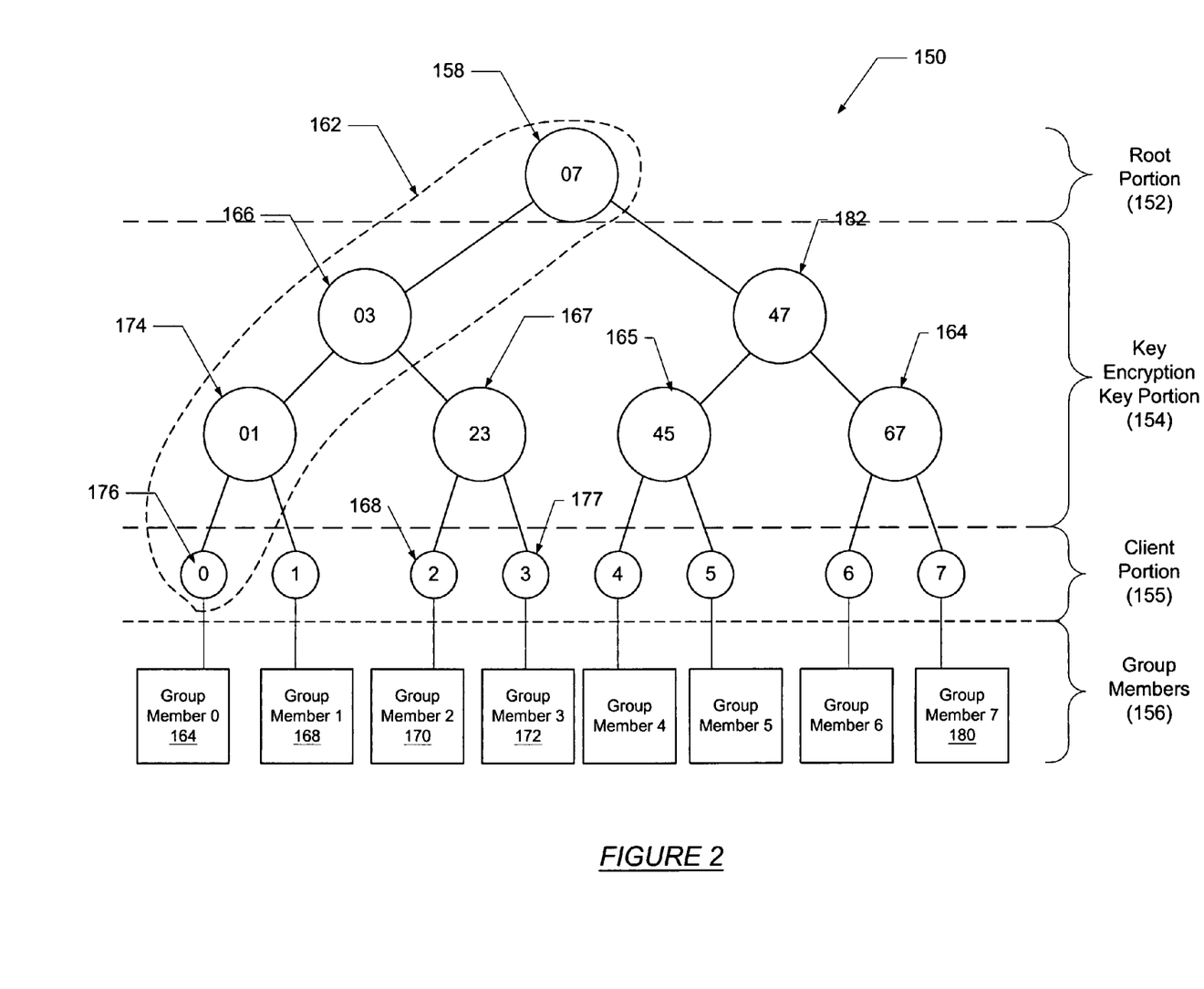
FIG. 2 shows a keying material infrastructure in accordance with one embodiment of the invention.

FIG. 2 shows a keying material infrastructure in accordance with one embodiment of the invention. In one embodiment of the invention, the keying material infrastructure takes the form of a binary tree (150). Those skilled in the art will appreciate that the key material infrastructure may take the form of any N-ary tree or any other multi-level data structure. Continuing with the discussion of FIG. 2, regardless of the data structure used to express the keying material infrastructure, the keying material infrastructure includes three distinct portions: a root portion (152), a key encryption key portion (154), and a client portion (155).

The root portion (152) typically includes one node, which includes a traffic encryption key (not shown). The traffic encryption key is used to encrypt communications between the individual group members (156). The key encryption key portion (154), includes one or more nodes that contain symmetric keys (typically in encrypted form) and asymmetric keys which are used to convey the encryption keys (e.g., traffic encryption keys, key encryption keys, etc.) (not shown) to the individual group members (156). The client portion (155) typically includes one or more nodes having symmetric keys (usually in encrypted form) and asymmetric keys that are associated with a particular group member.

In the keying material infrastructure shown in FIG. 2, there are eight group members (i.e., group member 0 (164) through group member 7 (180)). Each group member (156) includes the keys stored in the nodes along with path from the root portion (152) to the client portion (155) in the binary tree (150). Each node in the binary tree (150) includes public and non-public keying material. The contents of the individual nodes are described below in FIG. 3.

Continuing with FIG. 2, the numbers within each node in the binary tree (150) correspond to the group member or range of group members that know the non-public keying material (i.e., symmetric keys, private keys of a public-private key pair, etc.). Thus, consider the path (162) from node (158) in the root portion (152) to group member 0 (164). Node (158) is denoted by "07" indicating that all the group members (156) (i.e., group member 0 (164) through group member 7 (180)) share the non-public keying material within the node (156). Continuing down the path (162), node (166) is denoted by "03" indicating that only group member 0 (164), group member 1 (168), group member 2 (170), and group member 3 (172) share the non-public keying material in the node (166). The next node (174) in the path (162) is denoted by "01" indicating that only group member 0 (164) and group member 1 (168) share the non-public keying material in the node (174). Finally, the last node (176), i.e., the node in the client portion, is denoted by "0" indicating that only group member 0 (164) has access to the non-public keying material in the last node (176).

Those skilled in the art will appreciate that the number nodes in the path (162) (from the node in the root portion (152) to the node in the client portion (155)) that interfaces with the group member (e.g., node (176) in the above example) may be larger or smaller depending on the number of group members (156). In addition, as noted above, while the above example uses a binary tree and hence the ranges of group member (156) that have access to the non-public keying material in a given node is symmetrical, the ranges may be asymmetrical depending on the data structure (e.g., an N-ary tree, an unbalanced tree, etc.) used to express the keying material infrastructure.

Figure 3:
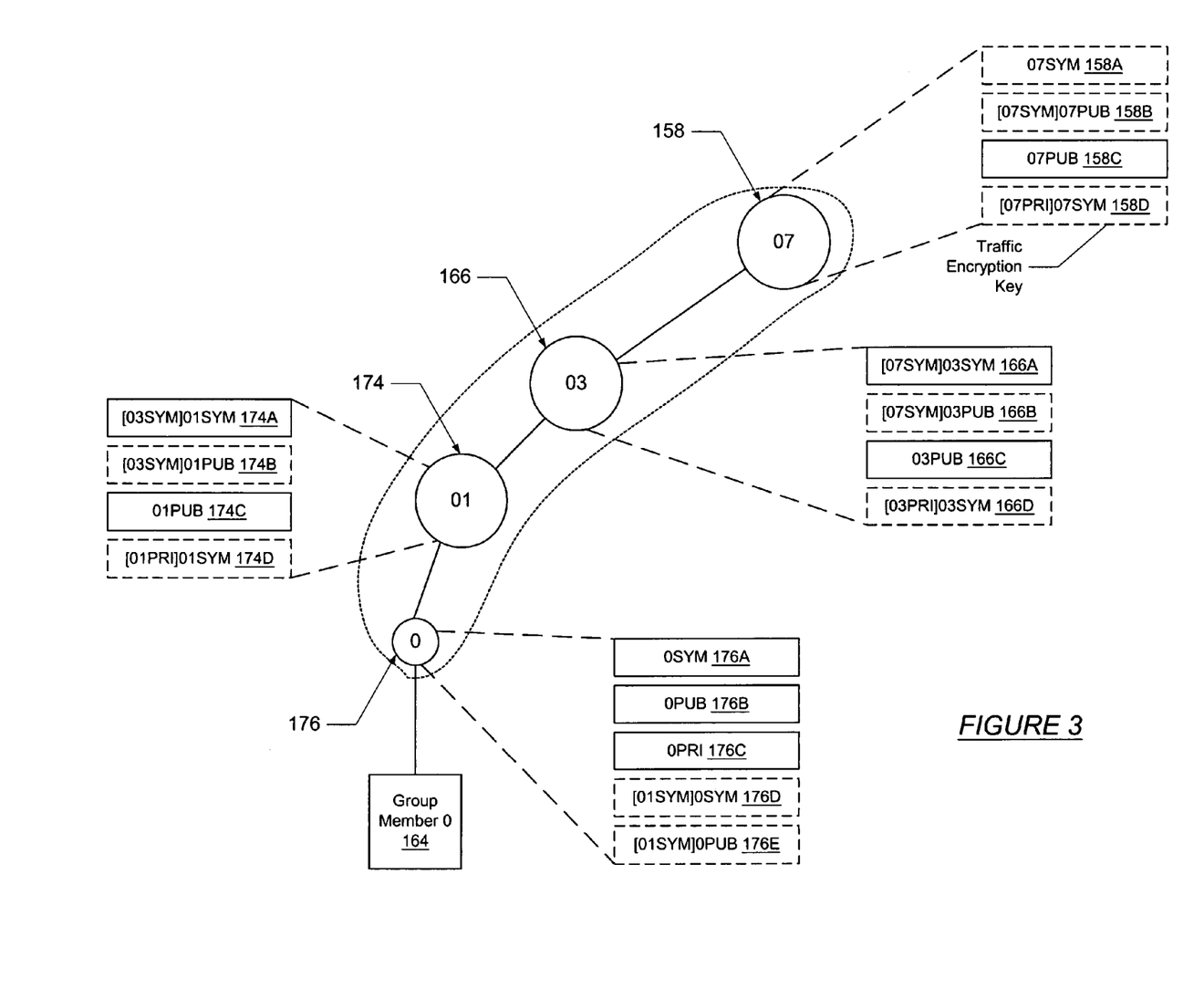
FIG. 3 shows a view of the key material infrastructure in accordance with one embodiment of the invention.

FIG. 3 shows a detailed view of the key material infrastructure in accordance with one embodiment of the invention. More specifically, FIG. 3 details the public and non-public keying material that may be present in a given node. The nomenclature used in FIG. 3 is as follows: 1) rectangles with broken lines indicate that the given field within node is optional; 2) the label "SYM" corresponds to a symmetric encryption key; 3) the label "PUB" corresponds to a public encryption key; 4) the label "PRI" corresponds to a private encryption key; 5) the number(s) preceding the encryption keys corresponds to the node with which the key is associated with, for example, "07SYM" corresponds to a symmetric key associated with the node (158) denoted by "07"; and 6) the syntax "[encryption key 1] encryption key 2" represents encryption key 1 encrypted with encryption key 2.

In FIG. 3, node (158) includes the key 07PUB (158C) and optionally includes key 07SYM (158A), encrypted key [07SYM]07PUB (158B), and encrypted key [07PRI]07SYM (158D). Those skilled in the art will appreciate that key 07SYM (158A) is typically not provided in unencrypted form in the keying material infrastructure. Key 07SYM (158A), also known as the traffic encryption key is unencrypted and is typically not stored in keying material data structure. Further, encrypted key [07SYM]07PUB (158B) is typically not stored in node (158) unless key 07SYM (158A) has been changed. In addition, encrypted key [07PRI] 07SYM (158D) may not need to be stored in the root node (158) if key 07PRI is derived from key 07SYM using, for example, the following algorithm. Initially, the symmetric key is used as input into a one-way function (e.g., Message Digest (MD) 5) to generate a key for a pseudo-random number generator. The pseudo-random number generator, using the aforementioned seed, is subsequently used to generate two prime numbers, e.g., p and q. The prime numbers are then used to generate the public and private keys using a pre-defined, generally known algorithm, for example, the Rivest, Shamir, and Adleman (RSA) algorithm.

Continuing with the discussion of FIG. 3, the next node (166) includes key 03PUB (166C) and encrypted key [07SYM]03SYM (166A), and optionally encrypted key [07SYM]03PUB (166B) and encrypted key [03PRI]03SYM (166D). Encrypted key [07SYM]03PUB (166B) is typically not stored in the node (166) unless key 07SYM (158A) has been changed. In addition, encrypted key [03PRI]03SYM (166D) may not need to be stored in the node (166) if key 03PRI is derived from key 03SYM using, for example, the algorithm described above. Similarly, node (174) includes key 01PUB (174C) and encrypted key [03SYN]01SYM (174A), and optionally encrypted key [03SYM]01PUB (174B) and encrypted key [01PRI]01SYM (174D). Like node (166), encrypted key [03SYM]01PUB (166B) is typically not stored in the node (166) unless key 03SYM (166C) has been changed. In addition, encrypted key [01PRI] 01SYM (174D) may not need to be stored in the node (174) if key 01PRI is derived from key 01SYM using, for example, the algorithm described above.

The last node (176) in the branch, i.e., the node in the client portion of the keying material infrastructure, includes key 0PUB (176B), key 0SYM (176A), key 0PRI (176C) and optionally encrypted key [01SYM]0SYM (176D) and encrypted key [01SYM]0PUB (176E). Typically, keys 0SYM (176A) and 0PRI (176C) are known only to the node (176) in the client portion (i.e., node (176)) and the corresponding group member (i.e., group member 0). In addition, encrypted key [01SYM]0SYM (176D) is provided by the group manager to the node (176) in the client portion, as needed. Further, encrypted key [01SYM]0PUB (176E) is typically only stored if key 01SYM has been changed.

Figure 4:
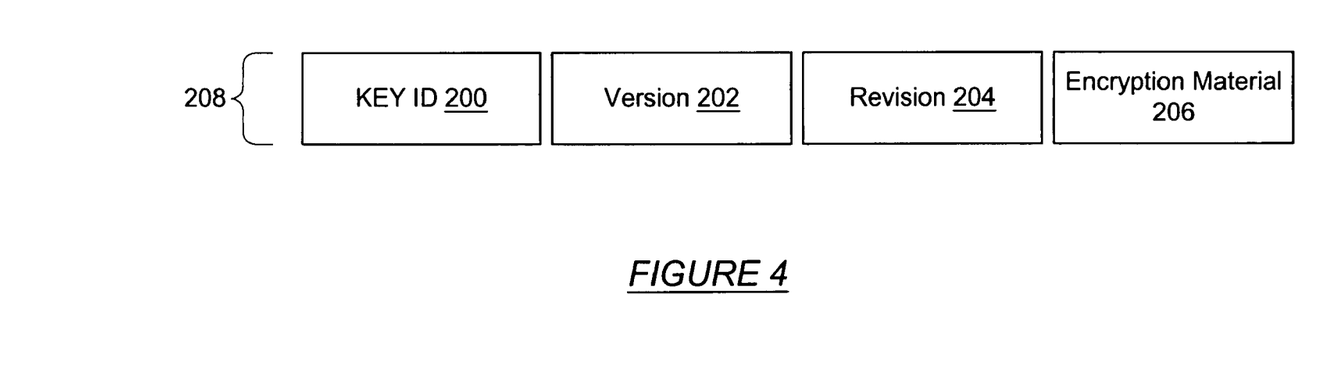
FIG. 4 shows a format for an encryption key in accordance with one embodiment of the invention.

FIG. 4 shows a format for an encryption key in accordance with one embodiment of the invention. The format shown in FIG. 4 may be used for both symmetric and asymmetric (i.e., public and private keys). Specifically, each key (e.g., 07PUB) in the keying material infrastructure includes a key ID (200), a version (202) field, a revision (204) field, and an encryption material (206) field. The key ID (200) uniquely identifies the key (208) within the keying material infrastructure. An example of a key ID (200) is "07SYM." The version (202) field reflects updates in the encryption material (206) field (i.e., when new encryption material was placed inside the encryption material (206) field). In contrast, the revision (204) field represents the number of times a given version of the encryption material (206) has been passed through a one-way function (e.g., MD5). The encryption material (206) field stores the encryption material (i.e., symmetric keys, public keys, private keys, etc.)

In one embodiment of the invention, the public key associated with the group member (e.g., key 0PUB is associated with group member 0 in FIG. 3) is signed by the group manager. The signing of the public key associated with a given group member may be used to prove group membership, to allow the group member associated with the public key (e.g., group member 0 in FIG. 3) to issue key changes on behalf of the all the group members, or to allow the group member (e.g., group member 0 in FIG. 3) to be a group owner (described below). Note the keying material infrastructure may be owned by more than one group member. In this case, each group owner should inform the other group owners about changes to the keying material infrastructure that the particular group owner initiated.

In one embodiment of the invention, each group member (e.g., group member 0 (164)) includes all the keying material (public and non-public) in the path from the node in the root portion to the node in the client portion. For example, referring to FIG. 2, group member 0 (164) includes all the keying material in nodes (158, 166, 174, and 176). Similarly, group member 3 (172) includes all the keying material in nodes (158, 166, 167, and 177).

Alternatively, a group owner (e.g., one of the group members having sufficient privileges to initiate a key change, as well as leave and join operations on behalf of the group members) may have access to all the keying material in the entire keying material infrastructure, except for the private keys (i.e., 0PRI, 1PRI, etc.) associated with the individual group members. As an additional alternative, all keying material stored within the keying material infrastructure, except for the traffic encryption key and the private and symmetric keys associated with the individual group members (i.e., 0PRI, 0SYM, 1PRI, 1SYM, etc.), may be stored in memory that is publicly accessible, i.e., memory that is not protected by a password or additional encryption. Those skilled in the art will appreciate that while the keying material infrastructure has been described as tree structure, the keying material infrastructure may be stored in any data structure, i.e., a flat file, linked list, etc., that preserves the relationship between the nodes.

Regardless of how is keying material is stored, access to the traffic encryption key occurs by using the symmetric key associated with the group member to traverse the nodes in the keying infrastructure to obtain the traffic encryption key. For example, using the binary tree branch shown in FIG. 3, group member 0 (164) using key 0SYM (176A) may decrypt encrypted key [01SYM]0SYM (176D) to obtain key 01SYM. Key 01SYM may be subsequently used to decrypt encrypted key [03SYM]0SYM (174A) to obtain key 03SYM. Key 03SYM may then be used to decrypt encrypted key [07SYM]03SYM (166A) to obtain key 07SYM (158A) (i.e., the traffic encryption key). The traffic encryption key may then be used to securely communicate data between the group members.

Figure 5:
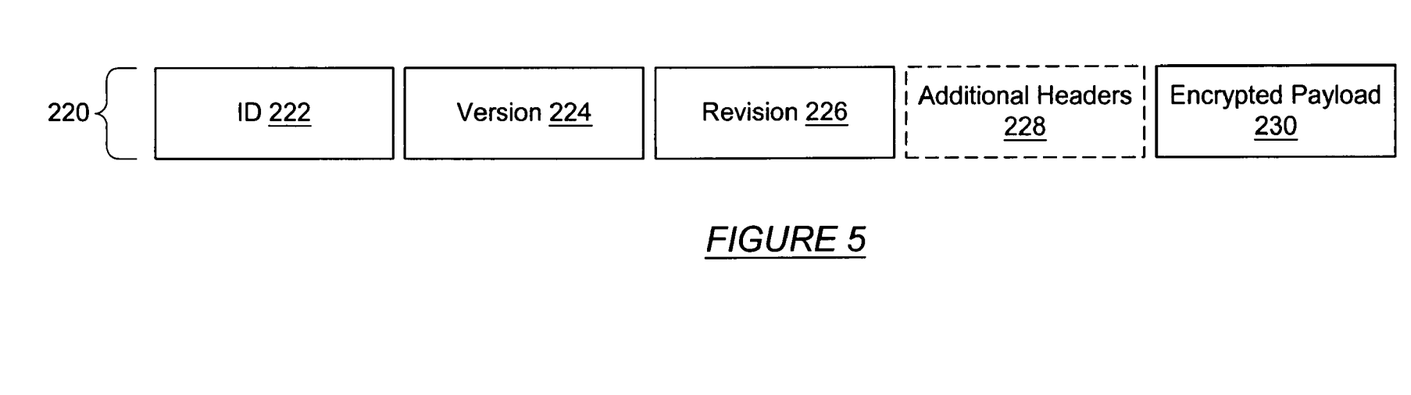
FIG. 5 shows a format for an encrypted message in accordance with one embodiment of the invention.

With respect to communicating data between group members, FIG. 5 shows a format for an encrypted message in accordance with one embodiment of the invention. Specifically, the encrypted message (220), in accordance with one embodiment of the invention, includes an ID (222) field, which uniquely identifies the encrypted message (220). Alternatively, the ID (222) field may contain information about which group member sent the encrypted message (220). The encrypted message (220) also contains a version (224) field and a revision (226) field associated with the traffic encryption key, which serve the same function as the version (202) field and the revision (204) field described above in FIG. 4. In addition, the encrypted message (220) may also contain an encrypted payload (230) (i.e., data encrypted using the traffic encryption key, e.g., Key 07 SYM (158A) in FIG. 3). Optionally, the encrypted message (220) may also contain additional headers (228) that may be used to communicate additional information between various group members.

As noted above, in one embodiment of the invention, the traffic encryption key is used to encrypt communication between group members. The remaining keys (i.e., keys within the key encryption key portion (154) shown in FIG. 2) are used to communicate the traffic encryption key to the group members. Specifically, the key encryption keys are used during join, leave, and traffic key encryption key change operations, as a secure means to communicate the keying material to group members. These specific operations are discussed below with respect to FIG. 6.

In one embodiment of the invention, the keying material infrastructure allows group members to join and leave. If these operations are initiated by a group owner (i.e., one group member that may have access to all the keying material in the entire keying material infrastructure except, for the private keys (i.e., 0PRI, 1PRI, etc.) associated with the individual group members, as described above) then the operations are referred to as "join by owner," and "leave by owner," respectively Alternatively, the keying material infrastructure described in the present invention also allows join and leave operations to be initiated by a non-owner (i.e., a group member that only has access to the non-public keying material from the particular branch associated with the group member, e.g., group member 0 (164) only knows non-public information in branch (162) as shown in FIGS. 2 and 3), these operations are referred to as "join by non-owner" and "leave by non-owner."

Figure 6:
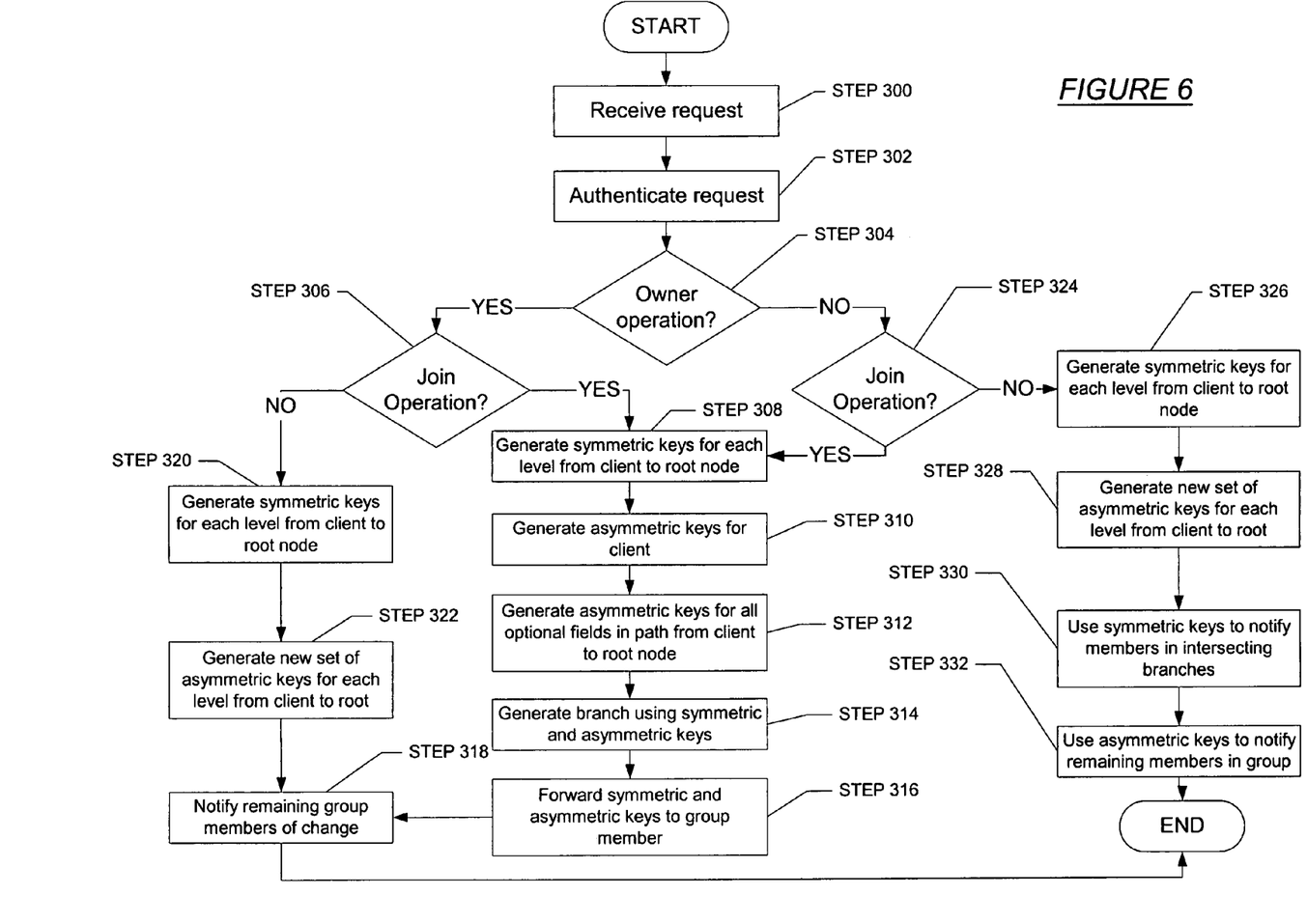
FIG. 6 shows a flow chart in accordance with one embodiment of the invention.

FIG. 6 shows a flow chart in accordance with one embodiment of the invention. More specifically, FIG. 6 shows one embodiment of the general flow of "join by owner," "leave by owner," "join by non-owner," and "leave by non-owner" operations. Initially, a request is received by a group manager (i.e., a process that includes functionality to determine whether the group member initiating the request has sufficient privileges to initiate the given request) (Step 300). As noted above, the functionality of the group manager may be distributed to the individual key managers associated with the individual group members (see FIG. 1). The request may be initiated by any group member, regardless of whether the group member is a group owner.

Continuing with FIG. 6, the request is subsequently authenticated to ensure that the requesting group member has sufficient privileges to initiate the particular request (Step 302). While not shown, if the request is not authenticated, then the operation specified in the request is not performed. After the request has been authenticated, the request is then queried to determine whether it was initiated by a group owner (i.e., an owner operation) (Step 304). If the request is an owner operation, then the request is further inspected to determine whether the request is a join operation or a leave operation (Step 306).

If the request is a join operation, the group manager rekeys all symmetric keys in the path from the node in client portion, with which the join group member is associated, to the node within the root portion (Step 308), and also generates a new public and private key pair for the node in the client portion (Step 310). Thus, referring to the keying material infrastructure in FIG. 2, if group member 0 (164) is joining the group, then new symmetric keys would be generated for nodes (158, 166, 174, and 176), and a new public and private key pair would be generated for the node (176) in the client portion which is associated with the joining group member (i.e., group member 0 (164)).

After the asymmetric keys for the node in the client portion has been generated and all the symmetric keys in the path from the node in the client portion to the node in the root portion have been rekeyed, all asymmetric keys located in the optional fields (as described in FIG. 3) that are in the path of nodes from the client node to the root node are rekeyed (Step 312). Note that the optional fields are typically set during non-owner operations, thus step 312 is typically only performed if the "join by owner" operation is performed after a non-owner operation has been performed.

In one embodiment of the invention, the symmetric keys are rekeyed by incrementing the revision field for each symmetric key and passing the symmetric key through a one-way function (e.g., MD5). Similarly, if the algorithm to generate public and private key pairs is well known (such as hashing the public and private keys, and using the resulting values to generate a new public and private key pair), then the public and private keys may be "rekeyed" and the operation recorded as an increase in revision number.

Once the rekeying has been completed for both symmetric and asymmetric keys, the rekeyed symmetric and asymmetric keys are used to generate the non-optional portions of the branch of the keying material infrastructure associated with the group member (Step 314). Thus, referring to the keying material infrastructure shown in FIG. 3, if group member 0 (164) joined the group then the non-optional portions shown in FIG. 3 would be generated using the rekeyed symmetric and asymmetric keys as well as the old public keys that did not need to be rekeyed.

Once the branch has been generated, the branch is forwarded to the corresponding group member (Step 316). In one embodiment of the invention, the branch may be forwarded to the group member via a unicast message. Alternatively, the group manager or owner may only provide the joining group member with the symmetric and public keys associated with the client with which the group member is interfacing. This limited amount of keying material may then be used to obtain the remainder of the branch. Thus, using the keying material shown in FIG. 2, group member 0 may only be provided with keys 0PUB and 0SYM Continuing with the discussion of FIG. 6, the remaining group members are subsequently notified of the rekeying (Step 318). In this particular instance, because the group owner performed the join operation, the rekeyed asymmetric and symmetric keys may be communicated to the remaining group members using symmetric keys. As an alternative, group owner may only communicate the new revision numbers corresponding to the rekeyed symmetric and asymmetric keys to the remaining group members. The remaining group members may then perform the rekeying locally.

Returning to FIG. 6, if the operation is not a join operation (i.e., the operation is a leave operation) (Step 306), then the group manager generates new symmetric keys for all symmetric keys in the path from the node in the client portion, with which the leaving group member is associated, to the node in the root portion (Step 320), The group manager also generates new public and private key pairs for each node in the path from the node in the client portion, with which the leaving group member is associated, to the node in the root portion (Step 322).

Unlike the join operation described above, the leave operation requires that new symmetric and asymmetric keys be generated, thus the version of each of the new keys is incremented while the revision field of the new keys is reset to one. Once the new keys have been generated, the remaining group members are subsequently notified of the rekeying (Step 318). In this particular instance, because the group owner performed the join operation, the new asymmetric and symmetric keys may be communicated to the remaining group members using the symmetric encryption. In one embodiment of the invention, new public and private key pairs are pre-computed to mitigate the processing load required to generate new public and private keys.

Continuing with FIG. 6, if the operation is not an owner operation (Step 304), then the request is further inspected to determine whether the request is a join operation or a leave operation (Step 324). If the operation is a join operation, then the steps in the operation following steps 308-318, as described with respect to a "join by owner" operation. However, step 318 is slightly modified when the operation is performed by a non-owner. Specifically, because the non-owner group member only have access to all the public portions of the keying material infrastructure and the private portions of the branch with which the non-owner group member is associated, updated symmetric keys and asymmetric keys are communicated to the other group members via symmetric and asymmetric cryptography.

Returning to FIG. 6, if the operation is not join operation (i.e., the operation is a leave operation) (Step 324), then the group manager generates new symmetric keys for all symmetric keys in the path from the client, with which the leaving group member is associated, to the root node (Step 326), The group manager also generates new public and private key pairs for each node in the path from the node in the client portion with which the leaving group member is associated with, to the node in the root portion (Step 328). Unlike the join operation described above, the leave operation requires generation of new symmetric and asymmetric keys, thus the version of each of the new keys is incremented while the revision field of the new keys is, for example, reset to one.

Symmetric cryptography is subsequently used to notify group members of the key change in intersecting braches (Step 330), and asymmetric cryptography is used to notify the remaining group members. Note that a single change message may be communicated to all group members (e.g., using a multicast message) incorporating both the symmetric cryptography and the asymmetric cryptography.

With respect to the non-owner leave operation, consider the following example using the keying material infrastructure shown in FIG. 2. In the first scenario, group member 7 (a non-owner) (180) forces group member 0 (164) to leave. The following is a portion of the change message that may be sent to all the remaining group members to remove group member 0 (164) from the group:

[01SYM']01PUB, [01PRI']01SYM', [03SYM']01SYM', [03SYM']23PUB, [03PRI']03SYM', [07SYM']03SYM', [07SYM']47SYM, [07PRI']07SYM', where the apostrophe (') signifies that the preceding key, i.e., key 07SYM is new. Note that the branch associated with group member 7 (180) intersects the branch associated with group member 0 (164) at node (162). Thus, symmetric key 47SYM may be used to communicated the new traffic encryption key to node (182). Similarly, in the second scenario, group member 2 (a non-owner) (168) forces group member 0 (164) to leave. The following is a portion of the change message that may be sent to all the remaining group members to remove group member 0 (164) from the group:

[01SYM']1PUB, [01PRI']01SYM', [03SYM']01SYM', [03SYM']23SYM, [03PRI']03SYM', [07SYM'] 03SYM', [07SYM']47PUB, [07PRI']07SYM', where the apostrophe (') signifies that the preceding key, i.e., 07SYM is new. Note that the branch associated with group member 2 (168) intersects the branch associated with group member 0 (164) at node (166). Thus, symmetric key, 23SYM, may be used to communicated the new traffic encryption key to node (167).

In addition to the functionality shown in FIG. 6, a non-owner may also generate a new traffic encryption key for the group. Specifically, referring to FIGS. 2 and 3, a non-owner may generate a new traffic encryption key, i.e., key 07SYM', and encrypt the new traffic encryption key using the current root node public key, i.e., key 07PUB, to obtain encrypted key [07SYM']07PUB. Encrypted key [07SYM']07PUB is subsequently stored in the root node. Encrypted key [07SYM']07PUB can then be obtained from the node in the root portion by other group members and the new traffic encryption key, i.e., key 07SYM', can be extracted from encrypted key [07SYM']07PUB using key 07PRI which is accessible to the group members that have access to encrypted key [07PRI']07SYM and key 07SYM. Thus, with respect to the aforementioned non-owner operations, the node performing the non-owner operations becomes in effect the owner of the keys that are required to be changed as governed by the operation (e.g., leave operation, join operation, etc.)

Embodiments of the invention provide a means to maintain perfect forward secrecy (i.e., a group members may only access data that the member had access to during the time the member was part of the group). Further, embodiments of the invention provide a means to maintain perfect forward secrecy without requiring a central management entity (i.e., a group owner). In addition, embodiments of the invention provide a means to change the traffic encryption key without requiring knowledge of the entire keying material infrastructure. Moreover, join and leave operations may be performed by group members that do not have access to all the keys in the keying material infrastructure.

Figure 7:
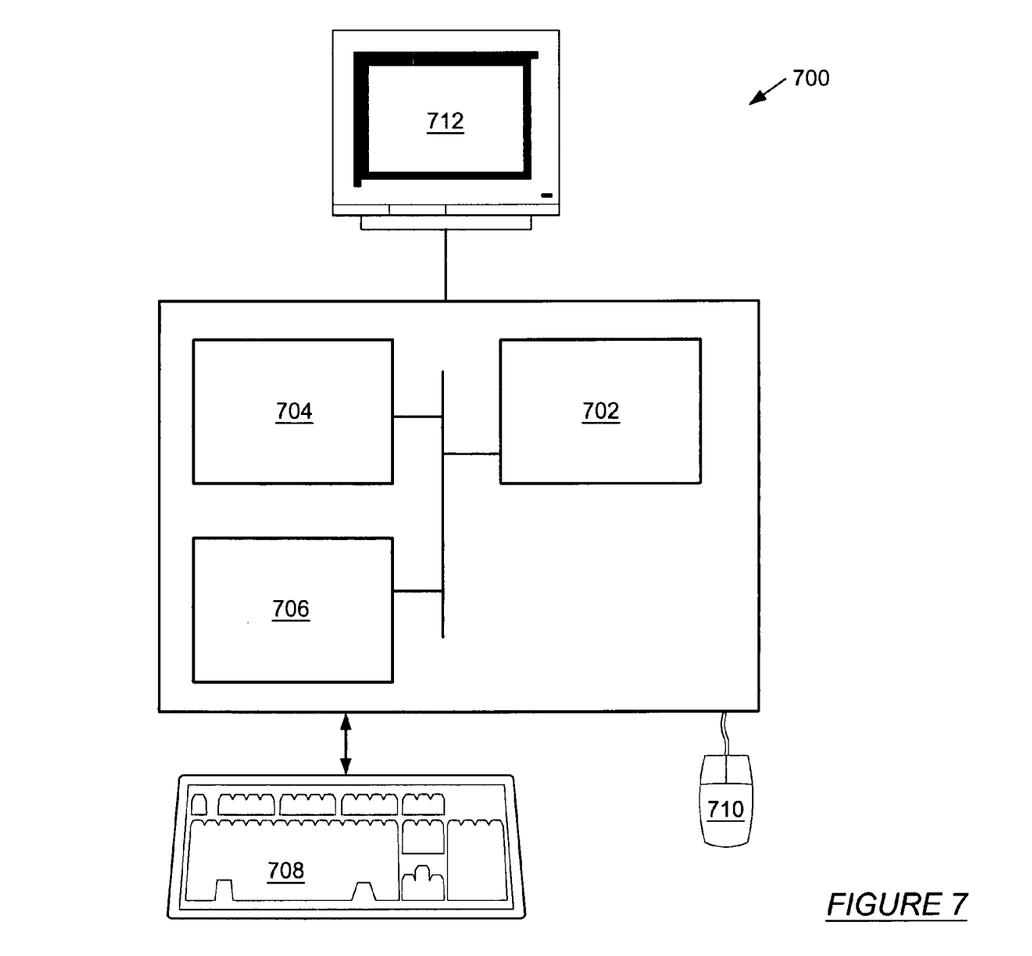
FIG. 7 shows a networked computer system in accordance with one embodiment of the invention.

The invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network (e.g., the Internet) via a network interface connection (not shown). Those skilled in the art will appreciate that these input and output means may take other forms. Further, those skilled in the art will appreciate that one or more elements of the aforementioned computer (700) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for group key management comprising:
  a keying material infrastructure comprising:
    a root portion configured to store a root public key;
    a key encryption key portion operatively connected to the root portion configured to store a traffic encryption key encrypted using a symmetric key encryption key, and a public key encryption key; and
    a first client operatively connected the key encryption key portion configured to store the symmetric key encryption key encrypted using a first client symmetric key; and
  a first group member configured to access the traffic encryption key using the first client symmetric key.

2. The system of claim 1, further comprising:
  a second client operatively connected to the key encryption key configured to store the symmetric key encryption key encrypted using a second client symmetric key; and
  a second group member configured to access the traffic encryption key using the first client symmetric key.

3. The system of claim 2, wherein data transferred between the first group member and a second group member is encrypted using the traffic encryption key.

4. The system of claim 2, further comprising:
  a group owner operatively connected to the keying material infrastructure and configured to manage the first group member and the second group member.

5. The system of claim 4, wherein group owner is configured to store the root public key, the traffic encryption key, the symmetric key encryption key, and the first client symmetric key.

6. The system of claim 5, wherein the group owner is configured to issue at least one selected from the group consisting of a join request and a leave request.

7. The system of claim 1, wherein the root portion is further configured to store a private root key encrypted using the traffic encryption key.

8. The system of claim 1, wherein the root portion is further configured to store the traffic encryption key encrypted using the root public key.

9. The system of claim 1, wherein the key encryption key portion is further configured to store a key encryption key encrypted using the symmetric key encryption key.

10. The system of claim 1, wherein the key encryption key portion leaf is further configured to store the traffic encryption key encrypted using the key encryption key.

11. The system of claim 1, wherein the traffic encryption key comprises a version number and a revision number.

12. The system of claim 1, wherein the first client is further configured to store a first client public key.

13. The system of claim 1, wherein the first group member is configured to issue at least one selected from the group consisting of a join request and a leave request.

14. A method for group key management for a plurality of group members, comprising:
  generating a request to perform at least one operation selected from the group consisting of a traffic encryption key change, a join operation, and a leave operation;
  determining whether the one of the plurality of group members initiating the request is a group owner;
  determining the one of the plurality of group members upon which the operation is being performed;
  rekeying a traffic encryption key and at least one client symmetric key, wherein the at least one client symmetric key is in a path from a client portion of a keying material infrastructure to a root portion of the keying material infrastructure;
  generating a root private key and an at least one client private key if the at least one operation is the leave operation;
  forwarding the traffic encryption key and the at least one client symmetric key to the plurality of group members using symmetric cryptography if the at least one operation is the join operation and the one of the plurality of group members initiating the request is the group owner;
  forwarding the traffic encryption key, the at least one client symmetric key, the root private key, and the at least one client private key to all of the remaining plurality of group members using symmetric cryptography, if the at least one operation is the leave operation and the one of the plurality of group members initiating the request is the group owner;

forwarding the traffic encryption key and the at least one client symmetric key to the plurality of group members using symmetric cryptography and asymmetric cryptography if the at least one operation is the join operation and the one of the plurality of group members initiating the request is not the group owner; and forwarding the traffic encryption key, the at least one client symmetric key, the root private key and the at least one client private key to all of the remaining plurality of group members using at least one selected from group consisting of symmetric cryptography and asymmetric cryptography if the operation is the leave operation and the one of the plurality of group members initiating the request is not the group owner.

15. The method of claim 14 further comprising:
authenticating the request, wherein the authenticating the request comprises determining whether the group member that initiated the request has sufficient privileges to request the at least one operation.

16. The method of claim 14, wherein rekeying the traffic encryption key comprises applying a one-way function to the traffic encryption key.

17. The method of claim 14, wherein the keying material infrastructure comprises:
the root portion configured to store a root public key;
a key encryption key portion operatively connected to the root portion configured to store a traffic encryption key encrypted using a symmetric key encryption key, and a public key encryption key; and
the first client operatively connected the key encryption key portion configured to store the symmetric key encryption key encrypted using a first client symmetric key.

18. A system comprising a plurality of nodes comprising:
a keying material infrastructure comprising:
   a root portion configured to store a root public key;
   a key encryption key portion operatively connected to the root portion configured to store a traffic encryption key encrypted using a symmetric key encryption key, and a public key encryption key; and
   a first client operatively connected the key encryption key portion configured to store the symmetric key encryption key encrypted using a first client symmetric key; and
a first group member configured to access the traffic encryption key using the first client symmetric key,
wherein root portion is stored on one of the plurality of nodes;
wherein key encryption key portion is stored on one of the plurality of nodes;
wherein the first client is stored on one of the plurality of nodes; and
wherein the first group member is stored on one of the plurality of nodes.

* * * * *